T. OFFICER & M. P. HOLMES.
TOOL ACTUATING DEVICE.
APPLICATION FILED NOV. 9, 1908.
1,275,171. Patented Aug. 6, 1918.
3 SHEETS—SHEET 2.
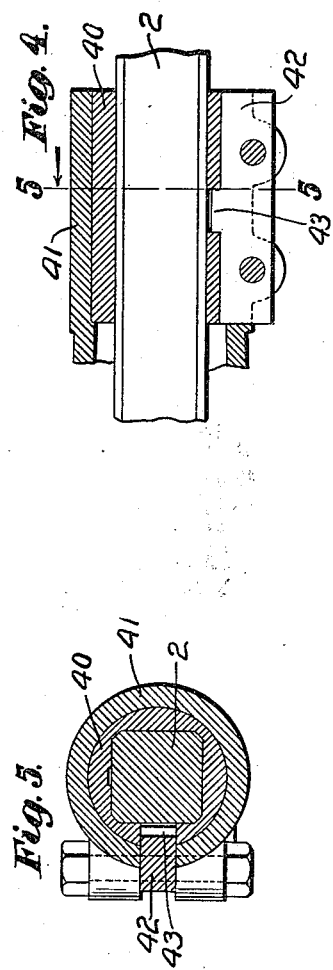
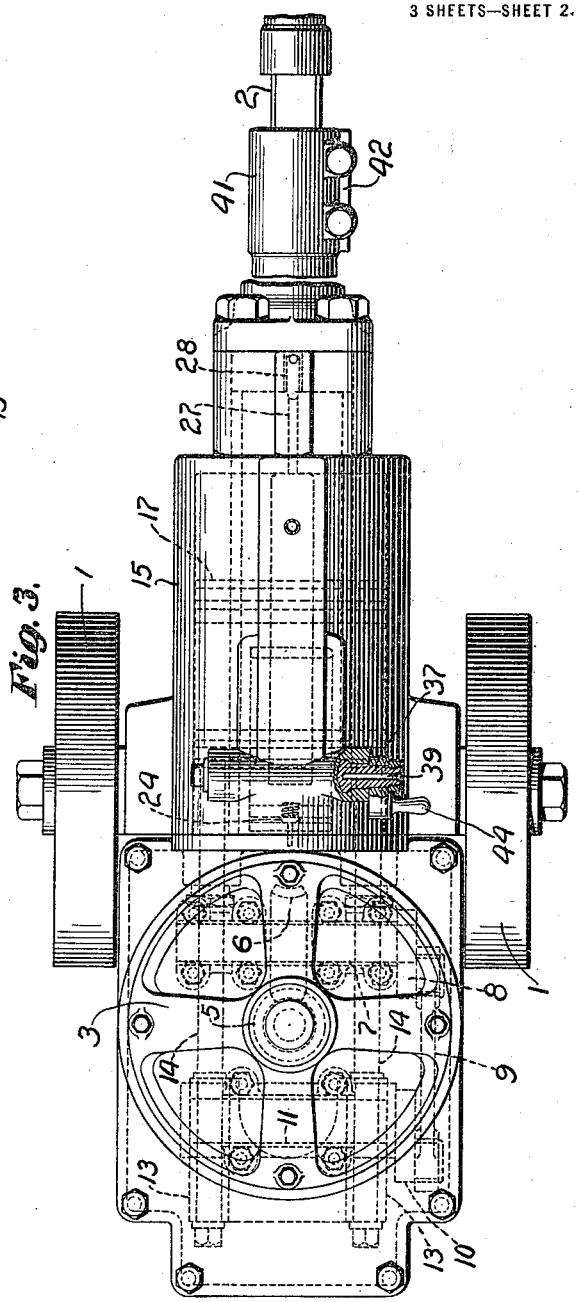
Witnesses:
Robert H. Kammler.
Edwin T. Luce.
Inventors:
Thomas Officer,
Morris P. Holmes,
by Emery Booth
Attys.

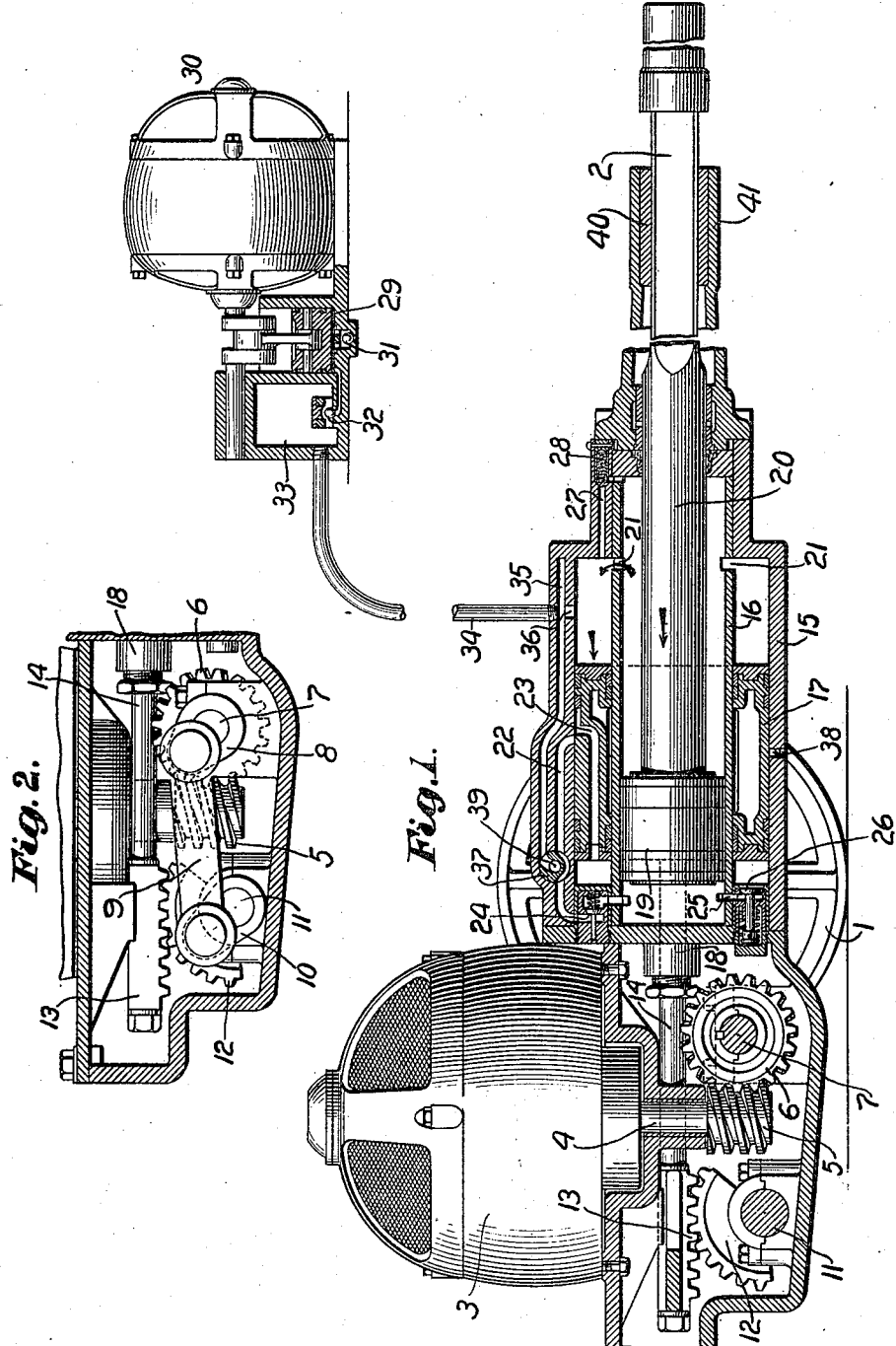

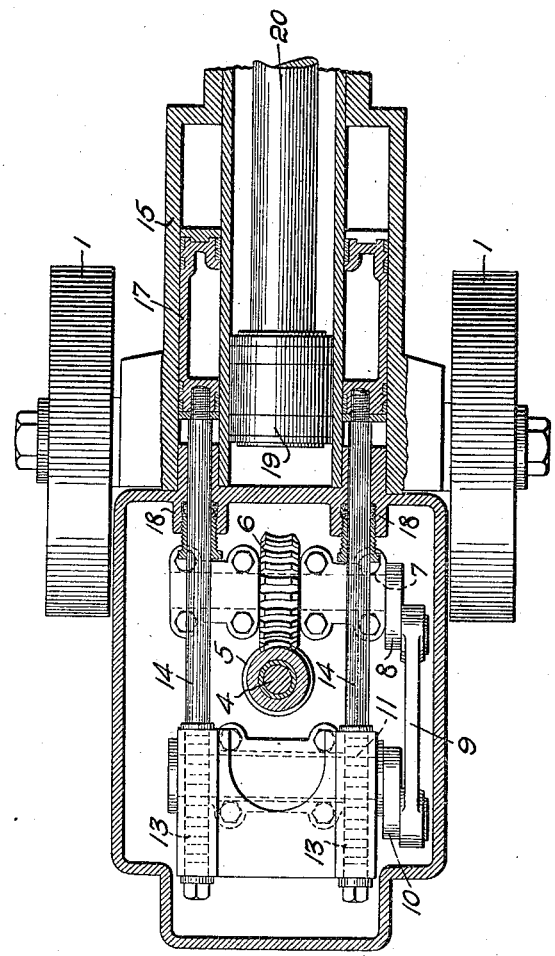

UNITED STATES PATENT OFFICE.

THOMAS OFFICER AND MORRIS P. HOLMES, OF CLAREMONT, NEW HAMPSHIRE, ASSIGNORS, BY MESNE ASSIGNMENTS, TO SULLIVAN MACHINERY COMPANY, OF BOSTON, MASSACHUSETTS, A CORPORATION OF MASSACHUSETTS.

TOOL-ACTUATING DEVICE.

1,275,171.  Specification of Letters Patent.  Patented Aug. 6, 1918.

Application filed November 9, 1908. Serial No. 461,622.

*To all whom it may concern:*

Be it known that we, THOMAS OFFICER and MORRIS P. HOLMES, both citizens of the United States, and residents of Claremont, in the county of Sullivan and State of New Hampshire, have invented an Improvement in Tool-Actuating Devices, of which the following description, in connection with the accompanying drawings, is a specification, like figures on the drawings representing like parts.

Our invention relates to tool-actuating devices, being more particularly concerned with those devices employed for imparting reciprocation to an impact member, such as a percussive tool of the kind employed for mining or stone cutting.

Our invention will be best understood by reference to the following description when taken in connection with the accompanying illustration of one specific embodiment thereof, while its scope will be more particularly pointed out in the appended claims.

In the drawings:

Figure 1 is a central, longitudinal section, in elevation, showing a mining machine or coal cutter embodying one form of our invention;

Fig. 2 is a sectional elevation of the power transmitting mechanism, showing certain parts omitted in Fig. 1;

Fig. 3 is a plan view of the coal cutter shown in Fig. 1;

Fig. 4 is a longitudinal section, on an enlarged scale, showing the form of chuck or tool holder employed;

Fig. 5 is a transverse section taken on the line 5—5 in Fig. 4, and

Fig. 6 is a plan view partly in section showing the driving connections for the working piston.

Referring to the drawings and to the embodiment of our invention there shown, the coal cutter there illustrated, as is usual in this class of devices, is mounted upon a wheel or truck 1, the latter supporting suitable operating mechanism which is adapted to reciprocate the tool rod or bar 2, having connected at its outer end a suitable and usual form of cutting tool, not herein shown.

Preferably, upon the frame of the machine is mounted a driving motor 3 of any suitable form, herein shown as an upright electric motor, to which current may be supplied from any suitable source by conductors (not shown). This motor is provided with an upright armature shaft 4, to the lower end of which is secured a worm 5 meshing with the worm gear 6 on the transverse countershaft 7, the latter journaled in bearings carried by the machine frame. The end of the countershaft carries a crank arm 8 (Fig. 2) jointed by the connecting rod 9 to a somewhat longer crank arm 10 on the parallel rock shaft 11, so that, as the gear 6 is rotated by the driving motor, the connecting rod and crank arm 10 are given a reciprocatory movement acting to rock the shaft 11 and the pair of gear sectors 12 which are fixedly secured thereto.

Meshing with each of the gear sectors 12 is a rack 13, suitably guided in the framework and secured to a driving rod 14, these two reciprocatory driving rods acting to reciprocate the tool rod 2 by interposed connections. Such connections in the illustrated form are as follows:

Rigidly attached to the machine frame is a main outer cylinder 15 providing a closed chamber between which and an inner lining or shell 16 there is adapted to reciprocate a packed annular driving or working piston 17, the latter being connected to the ends of the said actuating rods 14 which, for this purpose, pass through suitably packed glands 18 in the rear end wall of the said cylinder.

Within the shell or lining 16 there is further provided the driven or tool piston 19 connected to the piston rod 20 and the tool rod 2, and adapted to be reciprocated by the air or other pressure fluid alternately displaced and compressed at opposite ends of the outer or working piston 17.

For this purpose there is provided, between the forward end of the main cylinder 15 and the forward end of the tool cylinder, free communication through the passages 21, so that, as the working piston is reciprocated, the fluid at the forward end thereof is displaced and forced into the tool cylinder to drive the tool piston back, or withdrawn from the front of the tool piston to lower the pressure thereat and facilitate the forward or working stroke of the tool. In other words, the forward wall of the working piston constitutes a pulsating wall or pulsating means, the forward and backward movements thereof effecting a corresponding increase or decrease in the pressure of the working fluid at the front of the working piston tending to cause the pulsation of the latter in accordance with the pulsations of such wall.

While we preferably provide free communication between the forward end of the tool piston and the forward or pulsating wall of the working piston 17, so that there is in effect interposed between the two an elastic fluid body only, in order to produce a quick and more effective working stroke for the tool we have provided means for first compressing the motive fluid and then delivering it after compression to the working or rear side of the tool piston to permit the sudden expansion thereof to cause the working stroke of the tool. For this purpose the rear side or wall of the working piston constitutes a compressing means and for this purpose communicates with the rear side of the tool piston through a passage 22, which, however, is opened for the passage of fluid to the tool piston only near the close of the backward movement of the working piston and after the fluid at the back thereof has been compressed to the required degree. When the working piston has moved back sufficiently far, the passage 22 is placed in communication with the rear of the working piston through the port 23 formed in the walls of the piston. In Fig. 1 the piston port, as represented, is about to uncover the passage 22, whereupon the air compressed behind the working piston will enter the working end of the tool cylinder through the said passage and there expand to drive the piston suddenly and violently forward.

The passage 22 is preferably provided with a check valve 24 opening toward the tool cylinder, so that the air cannot return through such passage, but, on the return stroke of the tool piston, such air, then expanded, is expelled from the end of the tool cylinder through the auxiliary passage 25 and the check valve 26, which latter opens directly into the end of the working cylinder.

In the apparatus as described, therefore, the working piston on its return stroke compresses the trapped air or other fluid at its rear end, while the recession of the pulsating wall at its forward end lowers the pressure in front of the tool piston, making ready for the subsequent working stroke. When the working piston has moved back far enough to open the passage 22 to the piston port 23, the highly compressed air enters the rear of the tool cylinder and, expanding, drives the tool piston suddenly forward. During the succeeding forward stroke of the working piston 17, the air at the front thereof is driven into the front end of the tool cylinder, causing the return stroke of the tool piston. The latter thereupon causes the expulsion of the expanded air at its back into the rear of the working cylinder through the check valve 26. By this means the working stroke of the tool is effected quickly and more efficiently, while the return stroke is effected at a relatively slower speed.

To provide a cushion for the working stroke in case the tool misses the work, the tool cylinder is prolonged beyond the passage 21 so that the fluid trapped therein will form a cushion. Preferably also, in order to keep the tool piston at all times under the control of the forward pulsating wall of the working piston and to cause the return of the tool piston, in the event that the tool sticks in the cut and the piston enters into the cushion, there is provided a by-passage 27 leading from the forward end of the working cylinder to the prolonged or cushioned portion of the tool cylinder. Such by-passage is closed by a check valve 28 against the passage of air from the tool cylinder, whereby to maintain the cushion, such check valve, however, yielding to permit the passage of air to the tool cylinder.

The pressure fluid employed at opposite ends of the working cylinder may be initially introduced at the pressure of the atmosphere, or may be initially more or less compressed to strike a less elastic blow. If it is desired to employ an initially built up pressure, an auxiliary compressing device may be employed for initially compressing the motive fluid and supplying the leakage of such compressed fluid to the apparatus. In the apparatus shown in Fig. 1 we have there disclosed an auxiliary compressing device 29 comprising a piston and cylinder, the former reciprocated by the electric motor 30, and the latter provided with the inlet check valve 31 and the outlet check valve 32. The latter is adapted to discharge the compressed air into a receiver 33, which latter has communication through the pipe 34 with a passage 35 in the top of the working cylinder 15. The passage 35 is in open communication with the forward end of the working cylinder through the passage 36, and to equalize the pressure at opposite ends of the working cylinder the same may also be placed, if the compressing device is employed, in communication with the rear of the working cylinder by means of the equalizing throttle valve 37.

In the event that it is desired to operate the apparatus without the initially built up pressure, the pipe 34 may be disconnected from the cylinder, and the opening into which it enters plugged up. An opening 38 at the bottom of the cylinder, which is normally plugged up, is then opened to the atmosphere, so that on forward movement of the piston, such opening being uncovered, the atmospheric air will enter the rear of the said working cylinder, if the pressure therein is less than atmospheric. Such atmospheric air on rearward movement of the piston is compressed. To supply the air, when needed, to the forward end of the working cylinder, the valve 37 is provided with an axial passage 39 (Fig. 3) which opens into the atmosphere through the end of said valve, although normally closed by a plug threaded into the end when built up pressure is employed. When the plug is withdrawn, however, the passages 35 and 36 are opened to the atmosphere so that, on the return movement of the working piston, the atmospheric air may enter the working cylinder as soon as the port 36 is uncovered.

To prevent the tool rod 2 from turning, it is preferably caused to pass through a bushing 40 fixedly secured to the end of the cylinder, the said bushing holding the tool rod non-rotatively in any desired manner, as by the provision of a square or other non-circular cross-section for the tool rod, and a similarly shaped bore in the bushing. To prevent the bushing from turning, the latter is clamped between the split walls 41 of the cylinder head and a key 42 is inserted between the split portions of the said walls, said key entering the bushing and being clamped rigidly against displacement by the same clamping bolts which clamp the bushing in place. Preferably, the key is provided with a tongue 43 which locks it in place and further prevents any longitudinal movement.

In use, the machine may be rendered ineffective for cutting at any desired time by means of the throttle valve 37. For this purpose the said valve is provided with a handle 44 (Fig. 3) which handle may be thrown backward to turn the valve and place the passage 35, leading to the forward end of the working cylinder, in communication with the passage 22, which latter is intermittently connected with the rear of the working cylinder while, at the same time, the rear of the tool cylinder is opened to the atmosphere through the central passage 39 in the valve. The effect of this is to cause all the air delivered from both ends of the working cylinder to be delivered to the forward end of the tool piston, thereby causing the latter to be returned to the rear end of the tool cylinder and there maintained until the valve is again moved back to its normal position, as represented in Fig. 1, whereupon the tool piston is again caused to reciprocate as before.

While we have here referred to the operation of the apparatus through the medium of air, it will be understood that the same may be operated with equal facility through the employment of any other suitable pressure fluid medium.

While we have herein shown and described for purposes of illustration one specific form of our invention, it is to be understood that the details herein described are submitted for illustrative purposes only and that extensive deviations may be made without departing from the spirit of the invention.

Having thus described our invention, what we claim is:

1. An apparatus of the class described having a reciprocating driving member, a driven member, a working cylinder, a piston movable within the same, a piston movable within the first named piston, said driven member being connected to one of said pistons and said driving member to the other, there being interposed between the driving piston and one side of the driven piston a fluid body only, means for compressing fluid at the opposite side of the driving piston and means for delivering the compressed fluid to the remaining side of said driven piston and thereafter returning it to the driving piston.

2. An apparatus of the class described having a reciprocating driving member, a driven member, a working cylinder, a piston movable within the same, a piston movable within the last named piston, said driven member being connected to one of said pistons and said driving member to the other, means coöperating with said driving piston for causing the compression of fluid, means for delivering the same to said driven piston to move the latter through the expansion of the compressed fluid and for thereafter returning the expanded fluid to the compressing side of the driving piston, and means for returning the driven piston.

3. In an apparatus for reciprocating an impact member, the combination with a working piston, a cylinder containing the same, a tool piston, a cylinder for the tool piston contained concentrically within said working piston, means for reciprocating the working piston, passages connecting the forward end of the tool piston cylinder with one end of the working cylinder whereby the pulsations of fluid from the working piston may be conveyed to the forward side of the working cylinder, and means providing for the fluid compressed by the opposite side of the working piston to be delivered to the rear side of the tool piston after its compression to drive it forward by expansion.

4. In an apparatus for reciprocating an impact member, the combination with a working piston, a cylinder containing the same, a tool piston, a cylinder for the tool piston contained concentrically within said working piston, means for reciprocating the working piston, passages connecting the forward end of the tool piston cylinder with one end of the working cylinder whereby the pulsations of fluid from the working piston may be conveyed to the forward side of the working cylinder, and means providing for the fluid compressed by the opposite side of the working piston to be delivered to the rear side of the tool piston after its compression to drive it forward by expansion, said tool piston cylinder being also provided with a valved passage permitting the return of the expanded fluid at the rear of the tool piston to the working cylinder.

In testimony whereof, we have signed our names to this specification, in the presence of two subscribing witnesses.

THOMAS OFFICER.
MORRIS P. HOLMES.

Witnesses:
ALBERT BALL,
HARVEY C. BERKEY.

Copies of this patent may be obtained for five cents each, by addressing the "Commissioner of Patents, Washington, D. C."